(No Model.)　　　　　　　　　　　　　　　　　　2 Sheets—Sheet 1.
W. H. WHETSTONE.
CULTIVATOR.
No. 431,016.　　　　　　　　　　　　Patented June 24, 1890.
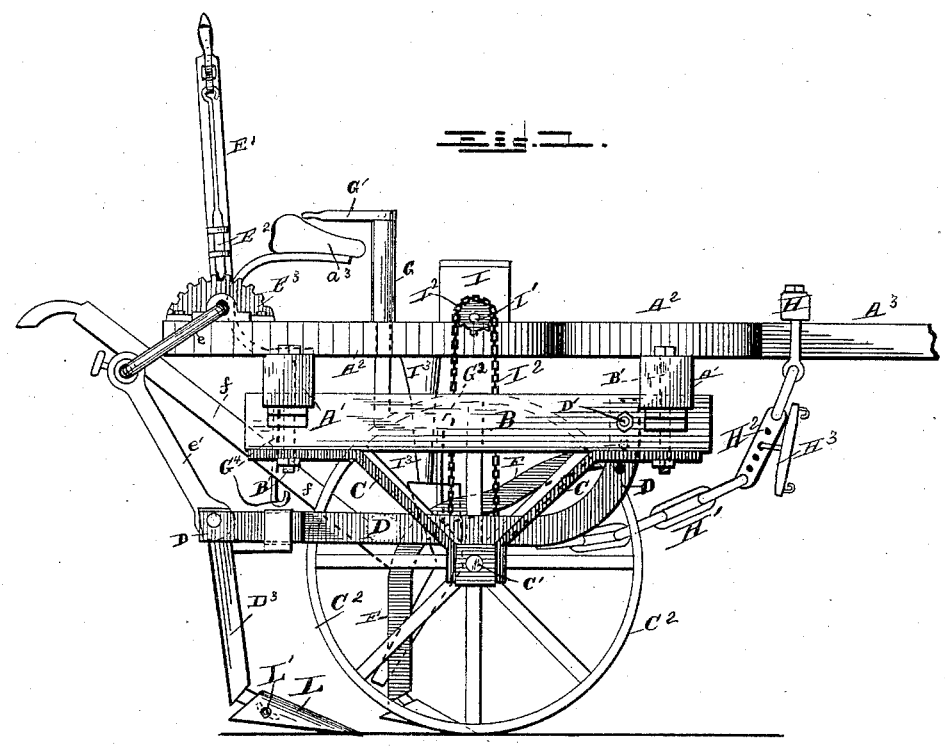
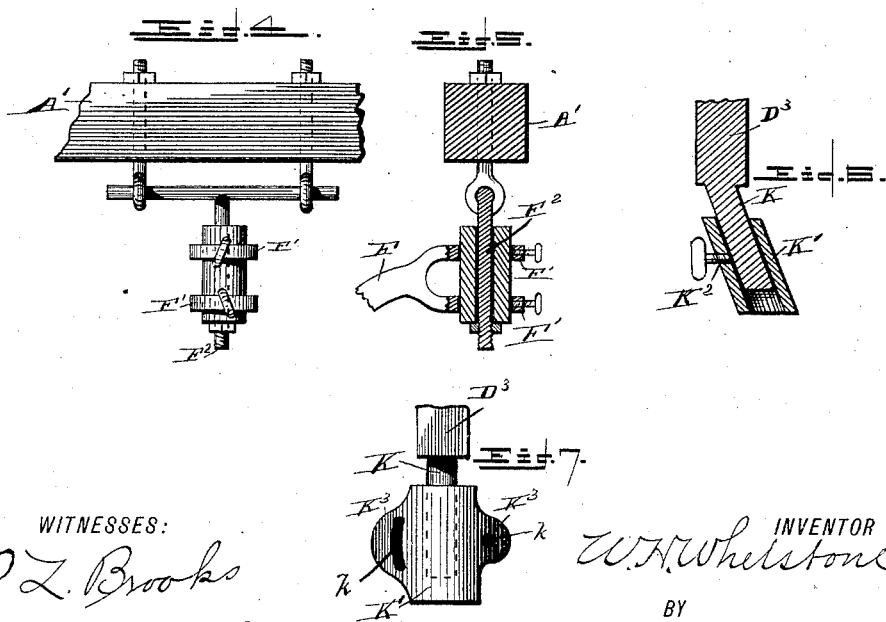
WITNESSES:　　　　　　　　　　　　　　　　INVENTOR
P. Z. Brooks　　　　　　　　　　　　　　　W. H. Whetstone
Arthur E. Dowell.　　　　　　　　　　　　BY
　　　　　　　　　　　　　　　　　　　　J. W. Alexander
　　　　　　　　　　　　　　　　　　　　ATTORNEY.

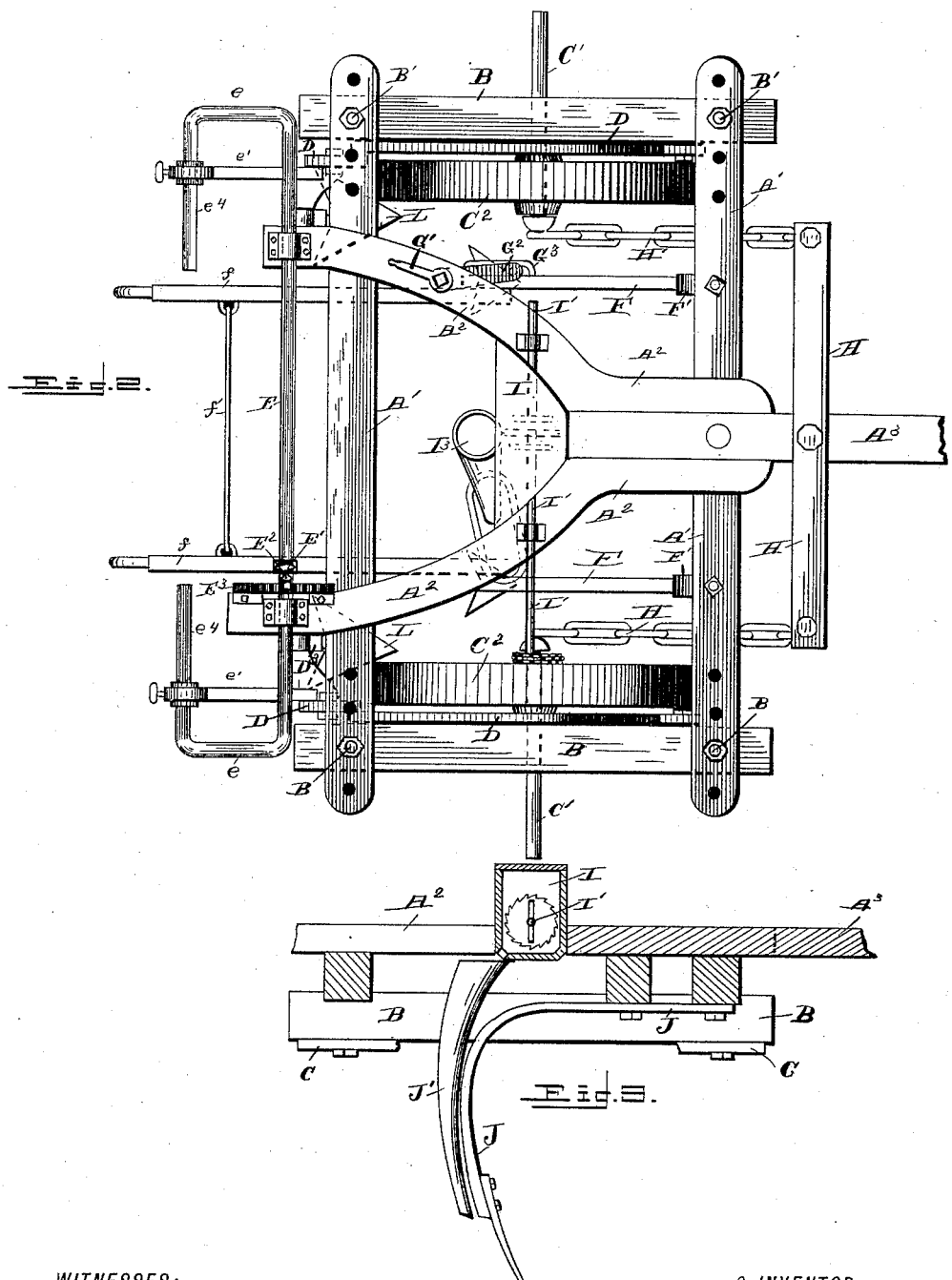

UNITED STATES PATENT OFFICE.

WILLIAM H. WHETSTONE, OF LOWNDESBOROUGH, ASSIGNOR TO THE WHETSTONE CULTIVATOR COMPANY, OF ANNISTON, ALABAMA.

CULTIVATOR.

SPECIFICATION forming part of Letters Patent No. 431,016, dated June 24, 1890.

Application filed January 7, 1890. Serial No. 336,181. (No model.)

*To all whom it may concern:*

Be it known that I, WILLIAM H. WHETSTONE, of Lowndesborough, in the county of Lowndes and State of Alabama, have invented certain new and useful Improvements in Cultivators; and I do hereby declare that the following is a full, clear, and exact description thereof, reference being had to the accompanying drawings, and to the letters of reference marked thereon, which form part of this specification, in which—

Figure 1 is a side elevation of my improved wheel-cultivator. Fig. 2 is a top plan view thereof. Fig. 3 is a detail vertical sectional view thereof, illustrating the planting or fertilizing devices attached thereto. Figs. 4, 5, 6, and 7 are details of the connections of the cultivator-beams and main frame, and of the shovels, and beams or stock.

This invention is an improvement in cultivators and harrows; and its objects are to provide a machine by which growing crops, like corn or cotton, which are planted in rows, can be conveniently and thoroughly cultivated, and also, if desired, fertilized; and the invention consists in a machine carrying a pair of plows or shovels which are adjustable toward or from each other and follow directly in the line of movement of the machine and close to the wheels, which are also adjustable laterally to suit varying widths of rows, and which plows can be positively set to enter the ground a certain depth only, or entirely raised from the ground; and the invention further consists in providing a pair of movable cultivating blades or plows which have a free movement in all directions and are under the control of the driver of the machine by hand or feet, and which lie between the two shovels. The machine is also provided with devices whereby fertilizing materials or seeds can be dropped; and it further consists in other novel details of construction and arrangement of parts, hereinafter described and claimed.

Referring to the drawings by letters, A designates the frame of the machine, which consists of two horizontal parallel front and rear bars A' A', connected by top pieces $A^2$ $A^2$ that are united at front to the tongue $A^3$.

B B are two transverse carrier-bars at the ends of the frame, which are adjustably attached to bars A' by means of bolts B', that engage openings $a$ in the bars A', as shown, there being a series of such openings in the ends of bars A', so that carrier-bars B can be secured thereto in different positions, either nearer to or farther from each other, as is evident. The bars B can be adjustably connected to frame A in any other convenient manner desired. To said carrier-bars B, and depending therefrom, are secured angular hangers C C, that carry stub-shafts C' C', upon which are mounted the supporting-wheels $C^2$ $C^2$, as shown.

To the front end of each carrier-bar B and inner face thereof is connected the end of a plow-beam D by a pivot-pin D', this beam lying between the inner face of the hanger C and wheel $C^2$, and above the hub of the latter, so as to swing vertically. In rear of the wheel the beam is bent inwardly and then rearwardly, and to this portion is connected a stock $D^3$, as shown, so that its foot lies close to and a little to the inside of the wheel, and to this foot is attached a plow point or shovel, preferably in the manner hereinafter to be described.

E designates a rod or shaft secured to the rear beam A' of frame A by proper strips or bearings, so that it can be rotated by a hand-lever E', attached thereto near its center, which lever is provided with a hand-latch $E^2$, adapted to engage a toothed segment $E^3$ on frame A, by which means the shaft can be locked in any position desired.

$e$ $e$ are crank-arms formed on the ends of shaft E, projecting rearwardly and then bent inwardly, as at $e^4$, and the pieces $e^4$ are connected by means of links $e'$ $e'$ to the plow-beams D D, respectively, permitting the plows to be adjusted laterally in relation to the shaft. Now, by rocking shaft E the plows or beams D D will be raised or lowered in relation to the frame A and wheels, and when the lever is locked by the segment the plow-beams will also be locked, by which means the plows can be readily uplifted clear of the ground or set so that their points are lower than the bottoms of the wheels $C^2$; hence they will cut a furrow of equal depth in all the ground over which the wheels C² run, following closely to said wheels, and these plows require no guidance by hand, and being attached to bars B B are laterally adjustable therewith to suit the widths of the rows.

F F designate the cultivator-beams, which are provided at their front ends with swiveled sleeves F' F', that are slipped on hanging rods F² F², suspended from the front beam of frame A between bars B B, as shown in Figs. 4 and 5, and secured to said rods by means of set-screws or in other convenient manner, so that the sleeves can be vertically adjusted on the rods, and thus vary the elevation of the cultivator-beams. Each beam F is provided with a handle $f$, and they are connected together by a link $f'$, so that they swing together and keep the same relative distance apart from each other, being allowed play in all directions, and are controlled easily by the plowman, who may walk behind the machine, or by the driver by means of a cranked rod G, secured to frame A near the driver's seat $a^3$, and provided with a handle G' on its upper end and a cranked arm G² on its lower end, which engages in a slotted piece or keeper G³, attached to one of the cultivator-beams, as indicated, so that by turning said crank-shaft the cultivator-beams are swung laterally, while the driver's feet, resting on the beams, can regulate the depth of the cultivator's cut. In light earth the driver could guide the cultivators readily with his feet.

When not in use, the cultivators can be suspended on the frame A by means of hooks or links G⁴, attached to the rear ends of the beams and engaging suitable keepers or catches on the rear beam of frame A.

H designates a doubletree attached to the tongue, and H' H' are chains connected to the ends thereof and to the inner ends of stub-shafts C', and H² H² are perforated plates or links in the length of said chain, to which are attached singletrees H³ H³, by which means the draft-strain is more evenly divided between the parts of the machine proper and relieving draft-strain on the front bar of the frame in a great measure.

I designates a hopper for fertilizer or seed provided with dropping-tube I³ and with a feeding device of any proper construction, which is operated by shaft I', driven by a belt or chain I² from a sheave or pulley on the hub of one of the wheels C², substantially as indicated.

When used as a planter, a furrow-opener J, Fig. 3, is bolted to the front beam of frame A between the cultivator-beams, and the dropper-tube J' leads from the hopper directly in rear of said opener, while the cultivator-shovels are then utilized as furrow-closers or coverers for the seed. When used as a fertilizing-distributer, the furrow-opener is removed and two dropping-tubes can be used which will direct the fertilizer in rear of the cultivator-blades so that it will be dropped close to the roots of the plants.

The plow-stocks and cultivator-beams are preferably provided with cylindrical feet K, as shown in Figs. 6 and 7, upon which are mounted tubular castings K', having adjusting set-screws K², each casting having a flaring extended portion K³ for receiving the plow-blade or shovel. This portion K³ has a bolt-opening $k$ at one side, and opposite thereto a curved slot $k'$, also adapted to receive a bolt, and the shovels or blades L have opposite bolt-holes at points corresponding to openings $k$ and slot $k'$, so that when the blade is fitted on the face of the casting the securing-bolts L' L' may be passed therethrough, as indicated in the drawings. The object of slot $k'$ is to permit the blade to be shifted upon the casting, so that if the foot be turned sidewise in any adjustment of the beam or cultivator in order to work the sides of the rows in which the plants are growing, the bolt L', engaging slot $k'$, can be loosened, the shovel turned upon the other bolt L' as a pivot until its point is perpendicular to the inclined surface of the row and parallel to the line of the movement of the machine, the bolt L' moving in slot $k'$ during this adjustment and then being tightened, securely locking the shovel in the position desired.

Having thus described my invention, I claim—

1. The combination of the main frame, the adjustable carrier-bars secured thereto, and the plow-beams pivotally attached to said bars, with the adjustable shaft mounted on said frame, the crank-arms on said shaft, and the link-connections between said arms and plow-beams, substantially as described.

2. The combination of the main frame, the plow-beams connected to the end bars thereof, and the shaft and its connections for vertically adjusting and locking said beams, with the pair of cultivators arranged between and independent of the plow-beams and connected to the frame, so that they can move freely in all directions, substantially as set forth.

3. The combination of the main frame, the adjustable carrier-bars attached to the ends thereof, the plow-beams, hangers, and wheels connected to and suspended from said bars and adjustable therewith, and the cranked shaft mounted on the main frame and connected by links to the plow-beams, and the lever and segment for adjusting and securing said shaft, all substantially as described.

4. The combination of the main frame, the adjustable carrier-bars, and plow-beams, wheel-hangers, wheels, and stub-shafts carried by said bars, with the doubletree, the chain connected thereto and to the inner ends of the stub-shafts, and the adjusting mechanism for said plow-beams, all substantially as described.

5. The combination of the main frame, the adjustable carrier-bars secured thereto, the plow-beams, and wheels supported by said bars, and the pair of cultivators suspended from the frame between said carrier-bars independent thereof, with the furrow-opener in front of and between the cultivators, substantially as and for the purposes described.

In testimony that I claim the foregoing as my own I affix my signature in presence of two witnesses.

WILLIAM H. WHETSTONE.

Witnesses:
ARTHUR E. DOWELL,
P. L. BROOKS.